Feb. 13, 1940.  E. R. GOLDFIELD ET AL  2,189,894
X-RAY TUBE CURRENT METERING MEANS
Filed Oct. 17, 1938
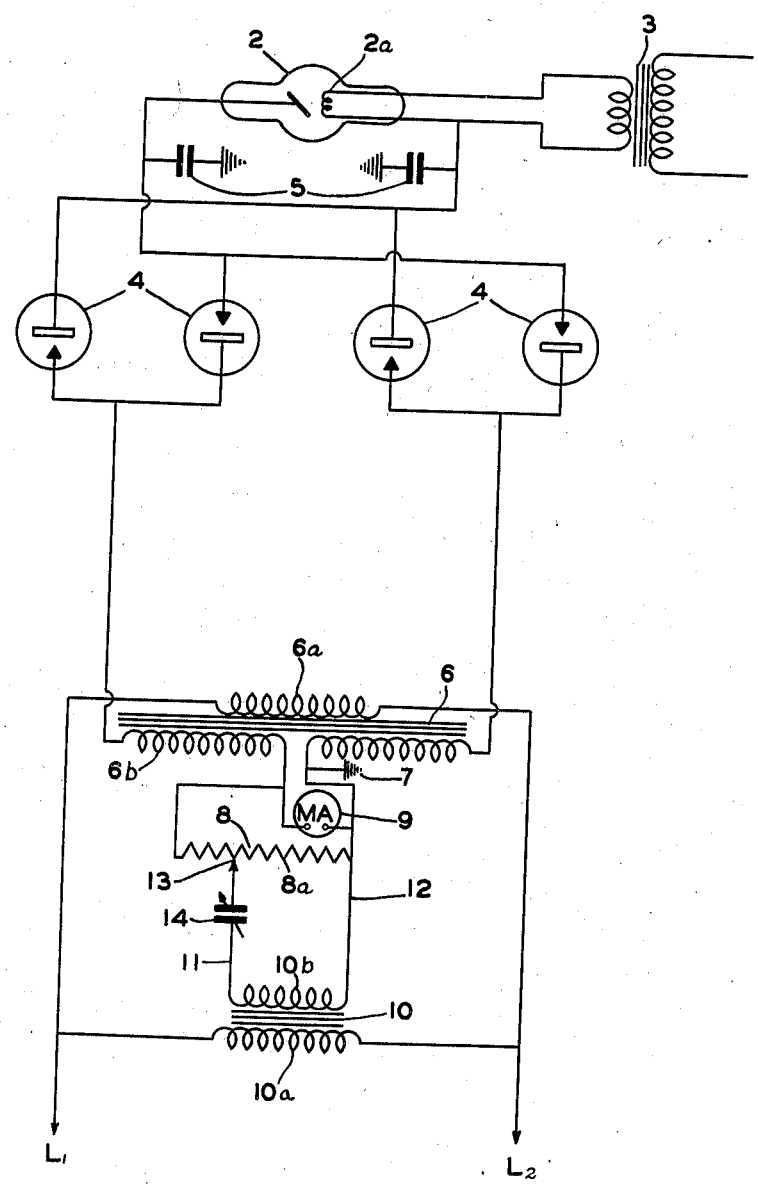
INVENTOR
EDWIN R. GOLDFIELD &
CAPERTON B. HORSLEY
BY
Hyde, Higley + Meyer
ATTORNEYS Patented Feb. 13, 1940

2,189,894

UNITED STATES PATENT OFFICE 2,189,894

X-RAY TUBE CURRENT METERING MEANS

Edwin R. Goldfield, University Heights, Ohio, and Caperton B. Horsley, Toronto, Ontario, Canada, assignors to Picker X-Ray Corporation Waite Manufacturing Division, Inc., Cleveland, Ohio, a corporation of Ohio Application October 17, 1938, Serial No. 235,372

1 Claim. (Cl. 250—100)

This invention relates to means for obtaining an accurate indication of the milliamperage through an X-ray tube where the tube is supplied with a full wave rectified high tension current.

Where an X-ray tube acts as its own rectifier the current passes through the tube in one direction only. Under these conditions a direct current milliammeter may be connected in the center ground circuit of the secondary winding of the high tension transformer and this meter will indicate the amount of current passing through the X-ray tube. This of course is the current passing in each alternate half wave. However if the output of the high tension transformer is fully rectified, current in the secondary of the high tension transformer is alternating, as is well known to those skilled in this art. Under these conditions a milliammeter connected in the secondary of the transformer will indicate not only the rectified current flowing through the X-ray tube but also a component of the alternating current due to the capacity to ground of the high tension windings, connections, valve tube mountings and the like. Since this leakage capacity current is in no way a function of the rectified current passing through the X-ray tube (but rather is a function of the voltage of the high tension transformer) it makes it impossible to calibrate any meter indicating the current flowing in the secondary of the transformer so that it will accurately indicate the current flowing through the X-ray tube. The present invention has for its object the indication of the milliamperage flowing through the X-ray tube by a milliammeter connected in series with the secondary of the high tension transformer while providing means for neutralizing the component of the current which is due to this capacity leak.

One embodiment of our invention is shown in the accompanying drawing and described in the specification and the essential features thereof will be set forth in the claim.

The drawing is a diagram showing one manner of applying our invention to an X-ray tube having a full wave rectification. The X-ray tube is shown at 2 having a filament 2a supplied in the usual manner with a heating current from the filament transformer 3. Full rectification for the tube is supplied in any conventional manner as for instance by means of the valve tubes 4 with suitable condensers 5, wherever necessary, all as will be well understood by those skilled in this art. The current for the tube is supplied from the source $L_1$, $L_2$ which may be connected with an autotransformer or the like for variation of voltage. The transformer for supply of current to the tube is indicated at 6 as having a primary 6a and a secondary 6b. The center circuit of the secondary is grounded at 7. In this center ground circuit is connected a resistance 8, and a meter 9 graduated in milliamperes is connected to measure the voltage drop across the resistance 8.

In carrying out our invention we provide means for bucking or balancing out that portion of the voltage drop through resistance 8 which is due to the leakage capacity current passing through resistance 8. This may be done using a second resistance but the simpler arrangement is to pass a current through a portion of resistance 8 in a direction opposite to the flow of the leakage capacity current and of a quantity to balance the voltage drop in resistance 8 due to the said leakage capacity current. In the drawing an arrangement is shown for passing a bucking current through the portion 8a of resistance 8.

The supply of current to the resistance 8a is by means of a transformer 10 whose primary 10a is connected in parallel with the transformer 6 to the source $L_1$, $L_2$. The secondary 10b is connected by lines 11 and 12 with opposite ends of resistance 8a, the point 13 being adjustable along resistance 8 to obtain the proper result. The relative arrangement of the transformer connections between transformer 6 and resistance 8 on the one hand, and transformer 10 and resistance 8a on the other hand, is such as to cause a flow in the opposite directions in resistances 8 and 8a at any given moment insofar as the metering circuit connected with the meter 9 is concerned so that the voltage drops across resistances 8 and 8a in the metering circuit oppose each other. For the purpose of insuring correct adjustment between the phase relation of these two voltage components, we provide a variable condenser 14 in line 11.

In this manner we balance out of the metering circuit the effect due to the leakage capacity current and so are able to measure in the center ground circuit of the secondary of the transformer 6 the full wave rectified current which is passing through the tube 2 and thus give an accurate indication of what is going on in the tube so that it is very accurately controlled.

By connecting the transformer primaries 6a and 10a in parallel in the manner shown we insure a synchronization of the alternations in their secondaries so that at any given moment the voltage drops across resistances 8 and 8a are opposing each other in the meter circuit. By a proper arrangement of suitable current supplied at the transformer secondary 10b coupled with the variable resistance 8a we are thus able to completely balance out the effect in meter 9 of the leakage capacity current so that the meter gives a proper indication of the current passing through the tube 2.

What we claim is:

In a circuit including an X-ray tube, a high-tension transformer and full-wave current rectifying means between the secondary of said transformer and said tube, metering means including a resistance which is in series with the secondary of said transformer and carries a leakage capacity current due to the capacity of the parts of said circuit, a meter connected in parallel with said resistance for measuring the voltage drop across it, a transformer having its primary winding in parallel with the primary of said first named transformer, the secondary of said last named transformer being provided with means adjustably connecting it with a variable portion of said resistance in a manner to pass bucking current therethrough in a direction and of a magnitude to oppose and balance out the leakage capacity current flow in said resistance and means for independently adjusting the phase relation between the opposing voltages impressed on said resistances.

EDWIN R. GOLDFIELD.
CAPERTON B. HORSLEY.